F. C. HOFFER, W. H. WHITESELL & F. H. BENTE.
STAND FOR MOTOR CYCLES AND BICYCLES.
APPLICATION FILED APR. 16, 1908.
940,250.
Patented Nov. 16, 1909.
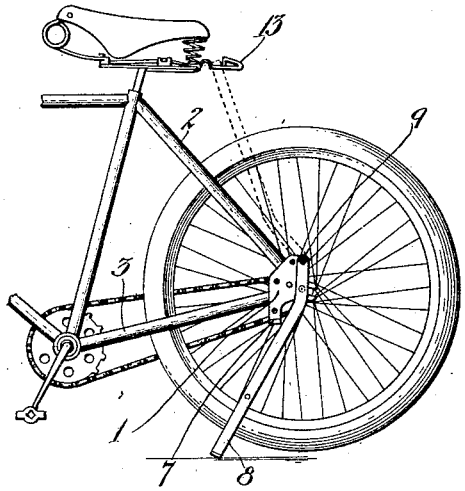
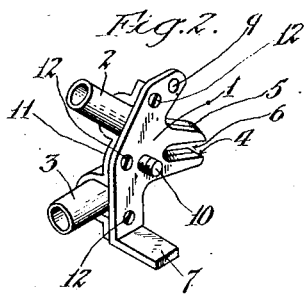
Witnesses:
Louis W. Gratz.
Frank L. Graham
Inventors,
Fred C. Hoffer,
Fred H. Bente,
William H. Whitesell

UNITED STATES PATENT OFFICE.

FRED C. HOFFER, WILLIAM H. WHITESELL, AND FRED H. BENTE, OF LOS ANGELES, CALIFORNIA, ASSIGNORS TO EXCELSIOR SUPPLY COMPANY, OF CHICAGO, ILLINOIS, A CORPORATION.

STAND FOR MOTOR-CYCLES AND BICYCLES.

940,250.      Specification of Letters Patent.     Patented Nov. 16, 1909.

Application filed April 16, 1908. Serial No. 427,550.

*To all whom it may concern:*

Be it known that we, FRED C. HOFFER, a subject of the Emperor of Austria-Hungary, WILLIAM H. WHITESELL, a citizen of the United States, and FRED H. BENTE, a citizen of the United States, all residing at Los Angeles, in the county of Los Angeles and State of California, have invented a new and useful Stand for Motor-Cycles and Bicycles, of which the following is a specification.

This invention relates to a stand for motor cycles and bicycles, and the objects of the invention are to provide a construction of the same which is simple and of economical manufacture and strong and durable in use.

The accompanying drawings illustrate the invention and referring thereto:—Figure 1 is a side elevation of the rear portion of a bicycle equipped with the device. Fig. 2 is a perspective of the attachment plate.

Two plates 1 are secured to the rear end of forks 2 and 3. The plate 1 has a slotted extension 4 upon its rear edge, preferably intermediate its ends, which conforms in shape to a plate 5 which is the usual connection plate uniting two members of each fork, the plate 5 being slotted at 6 to register with the slot in plate 1. The plate 1 is also provided with a laterally extending lug 7 which forms the abutment for the arm 8 of the stand, both arms of the latter being pivoted at 9 to the respective plates 1. Each plate 1 also is provided with a threaded stud 10 forming means for securing a frame for the tandem or package carrier, not shown. Each plate 1 is clamped to the fork by a plate 11 which clasps the fork members 2 and 3 and is attached to the plate 1 by means of screws 12. The slotted plates 4 and 5 are adapted to receive the rear axle and thus the plate 1 in addition to being held in position by plate 11 is also the more securely held in position by the rear axle and at the same time permits the rear axle to be readily removed without disturbing the attachment.

When the stand is not in use it is swung into the position shown in dotted lines in Fig. 1 and is engaged by the spring catch 13. To place the stand in operative position it is unhooked from the catch 15 and dropped down until it rests on the ground, then the motor cycle or bicycle is moved backward and the stand bearing on the ground gradually raises the rear end of the cycle as it is moved back until the parts stand, as shown in full lines in Fig. 1, with the arm 8 resting against the abutments 7.

What we claim is:—

1. In a bicycle support, a plate like member adapted to be secured to the rear end of a bicycle frame, the lower end of said member being provided with a laterally extending projection and the rear edge being provided with a slotted extension to register with the slot in the frame, and a support pivotally secured to said member above said projection; the free end of the support being adapted to be moved into a position below the wheel in front of a vertical line through the projection and thereby support the wheel and prevent the bicycle from falling over sidewise, the support being in engagement with the projection when its free end is thus holding the bicycle.

2. In a bicycle support, a plate like member adapted to be secured to the rear end of a bicycle frame and having a slotted extension on its rear edge to correspond with the slot of the frame, the upper end of the plate being perforated and the lower end provided with a laterally extending projection, a pin on the intermediate portion of the plate for the attachment of a seat or luggage carrier, and a prop like support pivotally secured at its upper end to the perforated portion of the plate, the free end of the prop being adapted to be moved into a position below the wheel in front of a vertical line through said lateral projection, said prop engaging with said projection when in its holding position.

3. In combination with a bicycle, a pair of plates secured to the rear of the frame, one upon each side thereof, each plate having its rear edge provided with a slotted extension to register with the slotted portion of the frame, the axle of the wheel being adapted to be projected through said slots and thereby assist in holding the plates in position, the lower portion of each plate being provided with a laterally extending lug, and a U-shaped stand pivotally secured to said plates above the wheel axle and having its lower end adapted to be moved into a position below the wheel and in front of a vertical line through said lugs, the sides of the stand engaging with said lugs when its lower end is in its forward position.

In testimony whereof, we have hereunto set our hands at Los Angeles, California, this 11th day of March 1908.

FRED C. HOFFER.
    WILLIAM H. WHITESELL.
    FRED H. BENTE.

In presence of—
    GEORGE T. HACKLEY,
    FRANK L. A. GRAHAM.